United States Patent
Bardainne (10) Patent No.: US 10,302,786 B2
(45) Date of Patent: May 28, 2019

(54) METHODS AND SYSTEMS OF DETERMINING A FAULT PLANE OF A MICROSEISMIC EVENT

(71) Applicant: Thomas Bardainne, Paris (FR)

(72) Inventor: Thomas Bardainne, Paris (FR)

(73) Assignee: CGG SERVICES SAS, Massy (FR)

( * ) Notice: Subject to any disclaimer, the term of this patent is extended or adjusted under 35 U.S.C. 154(b) by 1319 days.

(21) Appl. No.: 14/188,170

(22) Filed: Feb. 24, 2014

(65) Prior Publication Data

US 2015/0185344 A1    Jul. 2, 2015

Related U.S. Application Data

(60) Provisional application No. 61/921,951, filed on Dec. 30, 2013.

(51) Int. Cl.
| | |
|---|---|
| *G01V 1/00* | (2006.01) |
| *G01V 1/28* | (2006.01) |
| *G01V 1/30* | (2006.01) |
| *G01V 1/40* | (2006.01) |

(52) U.S. Cl.
CPC .............. *G01V 1/288* (2013.01); *G01V 1/30* (2013.01); *G01V 1/308* (2013.01); *G01V 1/008* (2013.01); *G01V 1/40* (2013.01); *G01V 2210/642* (2013.01)

(58) Field of Classification Search
CPC ............................................. G01V 1/30
See application file for complete search history.

(56) References Cited

U.S. PATENT DOCUMENTS

| | | |
|---|---|---|
| 2007/0127313 A1 | 6/2007 | Segall et al. |
| 2011/0067857 A1 | 3/2011 | Underhill et al. |
| 2012/0318500 A1 | 12/2012 | Urbancic et al. |

OTHER PUBLICATIONS

Search Report and Written Opinion, International Application No. PCT/IB2014/002948, 10 pages, dated Jun. 9, 2015.
Gephart, John W., et al., "An improved method for determining the regional stress tensor using earthquake focal mechanism data: application to the San Fernando earthquake sequence," Journal of Geophysical Research, vol. 89, No. B11, pp. 9305-9320, Oct. 10, 1984.
Oppenheimer, David H., et al., "Fault plane solutions for the 1984 Morgan Hill California, earthquake sequence :evidence for the state of stress on the Calaveras fault," Journal of Geophysical Research, vol. 93, No. BB, pp. 9007-9026, Sep. 10, 1988.
Rutledge, J.T., et al., "Geomechanics of hydraulic fracturing inferred from composite radiation patterns of microseismicity," SPE 166370, pp. 1-9, Sep. 30, 2013.
Aki & Richards, *Quantitative Seismology*, University Science Books, 700 pages, 2002.

(Continued)

*Primary Examiner* — Manuel A Rivera Vargas
(74) *Attorney, Agent, or Firm* — Patent Portfolio Builders PLLC (57) ABSTRACT

A moment tensor is determined using an inversion algorithm for each of a plurality of microseismic events passively detected by receivers. Each of the moment tensors includes two nodal planes. A subset of the microseismic events is grouped into a family of microseismic events. If the microseismic events in the family have a common nodal plane, the common plane is a solution fault plane for the family of microseismic events. Information related to the fault plane is used to optimize fracking operation.

20 Claims, 7 Drawing Sheets

(56) References Cited

OTHER PUBLICATIONS

A. Baig and T. Urbancic, "Microseismic moment tensors: A path to understanding frac growth", *The Leading Edge*, p. 320-324, Mar. 2010.
F. Finck et al., "Advances in Moment Tensor Inversion for Civil Engineering", *International symposium, BAM*, [online], 9 pages. http://www.ndt.net/article/ndtec03/papers/p008/p008.htm, 2003.
Eich et al., 12.510 Introduction to Seismology, MIT OpenCourseWare, 13 pages, Spring 2008.
M. Jost and R. Herrmann, "A Student's Guide to and Review of Moment Tensors", *Seismological Research Letters*, vol. 60, No. 2, p. 37-57, Nov. 1, 1988.

METHODS AND SYSTEMS OF DETERMINING A FAULT PLANE OF A MICROSEISMIC EVENT

PRIORITY CLAIM

This application claims the benefit under 35 U.S.C. § 119(e) of U.S. Provisional Application Ser. No. 61/921,951 filed Dec. 30, 2013.

TECHNICAL FIELD OF THE DISCLOSURE

This disclosure relates generally to seismic analysis, and in particular, to methods and systems of determining a fault plane of a microseismic event.

BACKGROUND

Seismic surveying or seismic exploration, whether on land or at sea, is accomplished by observing a seismic energy signal that propagates through the earth. Propagating seismic energy is partially reflected, refracted, diffracted and otherwise affected by one or more geologic structures within the earth, for example, by interfaces between underground formations having varying acoustic impedances. The affected seismic energy is detected by receivers, or seismic detectors, placed at or near the earth's surface, in a body of water, or down hole in a wellbore. The resulting signals are recorded and processed to generate information relating to the physical properties of subsurface formations. Some seismic exploration or monitoring may be done passively, or in other words, without generating a seismic energy signal explicitly for the purpose of recording the response. In addition to naturally induced microseismic event, microseismic events may be caused by human operations. This may include any circumstance in which human action changes the stress fields within geological structures in the Earth. Some examples include hydraulic fracturing (sometimes referred to as hydrofracturing or "fracking"), perforation shots, string shots, damming a water flow (like a river or stream), heating the ground, cooling the ground, mining, downhole events like drilling, injecting water or other liquid to displace oil or gas, and the discharge of downhole explosives.

Active and passive seismic monitoring are sometimes done over time, or in other words, in four dimensions (4D). In addition to an image of subsurface formations, 4D monitoring can provide information as to how seismic waves interact with those formations over time, or how the subsurface formations and their contents may change over time. For example, as a producing well is depleted, the introduction of water to displace oil or gas may cause a change in the way the seismic waves interact with the subsurface formations. As another example, fractures are formed during hydraulic-fracturing and the progress and quantity of these fractures can be monitored over time. These fractures occur along a fault plane.

The passive monitoring of fault planes can be advantageous in a variety of circumstances. For example, passive seismic monitoring can indicate the origin time, location and magnitude of earthquakes. Passive seismic monitoring for microseismic events can be used to estimate the location and orientation of a fault plane where a smaller fracture has occurred. Determining the location and orientation of a fault plane can provide insight into subsurface formations, including potential traps for oil and gas. A fault may move porous reservoir rock like sandstone or limestone against an impermeable seal like shale or salt, and if the fault does not leak, oil or gas can pool in the reservoir rock. Additionally, the formation and propagation of fractures by the creation of small fault planes can be beneficial when monitoring the progress of hydraulic fracturing. By monitoring the formation of faults in hydraulic fracturing, oil and gas workers may know when sufficient fracturing has been completed or whether more fluid needs to be pumped into the fracturing well.

One way to partially determine a fault plane associated with a seismic or microseismic event is by determining the moment tensor for the seismic or microseismic event. The moment tensor is a second order symmetrical tensor providing a mathematical representation of the forces generated by the seismic or microseismic event. The moment tensor includes nine generalized couples, or nine sets of two vectors. Each vector represents the force along one axis positioned along another axis (for example, one of the nine vector pairs represents the two divergent forces parallel to the x-axis originating at some location along the y-axis, causing a torque about the y-z plane). The moment tensor and the values of its included vectors depends on the strength of the seismic or microseismic event and the orientation of the fault along which the event occurs.

A moment tensor may be decomposed into double-couple and non-double-couple components. The double-couple components represent shear slippage along the fault plane for a seismic event. The non-double couple components represents other motions or forces, including outward motion or volume changes. For example, most large earthquakes are pure shear events along a pre-existing fault with no volume change and so the non-double-couple component is zero. In contrast, when a fracture is first opening a pure tensile event occurs where the double-couple component is zero. After the initial opening, most fractures progress towards a pure shear event, or a pure double-couple event as is seen for large earthquakes, and then revert back until the closure event of the fracture where the double-couple is zero.

For a given fracture, all microseismic events occurring along that fracture will correspond to a single "global" double couple, as all shear slippage will occur in the same direction on the same fault plane. In other words, the double couple component of the moment tensor for each microseismic event will be similar, showing the same pair of nodal planes. Typical passive seismic monitoring has focused on double couple components of the moment tensor.

Determining the moment tensor of a microseismic event is accomplished by inverting the raw data generated by the microseismic event. Except for certain extremes of non-double couple dominated events, the moment tensor includes two possible solution fault planes, referred to as the two nodal planes. These two planes represent the transition between positive first motions, or compressive forces, and negative first motions, or dilatational forces. For pure double couple events, the two nodal planes are orthogonal. For moment tensors with non-double couple components, the two nodal planes are non-orthogonal. Absent additional data collected separately about the subsurface formations in the region, there is no way to distinguish between the two nodal planes for a single microseismic event. The present disclosure provides a solution to determine which of the two possible solution fault planes corresponds to the actual fault plane.

SUMMARY

In one embodiment, the present disclosure includes a method of passive seismic data processing comprising determining a moment tensor for each of a plurality of microseismic events using an inversion algorithm and raw data detected at a plurality of receivers, each of the moment tensors including two nodal planes. The method further comprises grouping a subset of the plurality of microseismic events into a family of microseismic events. The method also includes determining whether the family of microseismic events include a single plane that is common across each of the nodal planes of the microseismic events for the moment tensors of the family of microseismic events. The method additionally includes selecting a solution fault plane for the family of microseismic events, the solution fault plane being the single plane.

In another embodiment, the present disclosure includes a system comprising a plurality of receivers to detect microseismic events and a network communicatively coupled to the plurality of receivers. The system also includes a computing unit coupled to the plurality of receivers comprising a processor unit and a memory unit coupled to the processing unit, the memory unit including instructions that, when executed by the processing unit, are configured to receive raw data associated with a plurality of microseismic events, and determine a moment tensor for each of a plurality of microseismic events using an inversion algorithm and the raw data detected at the plurality of receivers, each of the moment tensors including two nodal planes. The instructions are also configured to group a subset of the plurality of microseismic events into a family of microseismic events. The instructions are further configured to determine whether the family of microseismic events include a single plane that is common across each of the nodal planes of the microseismic events for the moment tensors of the family of microseismic events. The instructions are additionally configured to select a solution fault plane for the family of microseismic events, the solution fault plane being the single plane.

In an additional embodiment, the present disclosure includes a non-transitory computer-readable medium containing instructions that, when executed by a processor, are configured to determine a moment tensor for each of a plurality of microseismic events using an inversion algorithm and raw data detected at a plurality of receivers, each of the moment tensors including two nodal planes. The instructions are further configured to group a subset of the plurality of microseismic events into a family of microseismic events. The instructions are additionally configured to determine whether the family of microseismic events include a single plane that is common across each of the nodal planes of the microseismic events for the moment tensors of the family of microseismic events, and select a solution fault plane for the family of microseismic events, the solution fault plane being the single plane.

BRIEF DESCRIPTION OF THE DRAWINGS

For a more complete understanding of the present disclosure and its features, reference is now made to the following description, taken in conjunction with the accompanying drawings, in which like reference numbers indicate like features and wherein.

DETAILED DESCRIPTION

The present disclosure relates to passively monitoring for microseismic events and determining the orientation of a common fault plane along which the microseismic events have occurred. As described above, a moment tensor M includes two possible but indistinguishable planes (or in other words, two nodal planes) that could be the actual fault plane. To determine the actual fault plane, a moment tensor M is determined for each of a plurality of microseismic events by inverting raw data from a plurality of receivers. A group of microseismic events determined to be in close proximity to each other are then grouped into a family of microseismic events. The two nodal planes from each of the moment tensors M associated with the microseismic events of the family are then analyzed to find a common solution plane among each of the nodal planes of the family. The solution fault plane is determined to be the plane that is one of the two nodal planes for each of the microseismic events that is common across each of the nodal planes for the moment tensors of the family of microseismic events. In other words, for each of the microseismic events of the family, there will be one of the two possible solution planes, or nodal planes, that will be the same for each of them. This plane that is the same across the entire family of microseismic events is the solution plane representing the actual fault plane along which the microseismic events have occurred.

Figure 1:
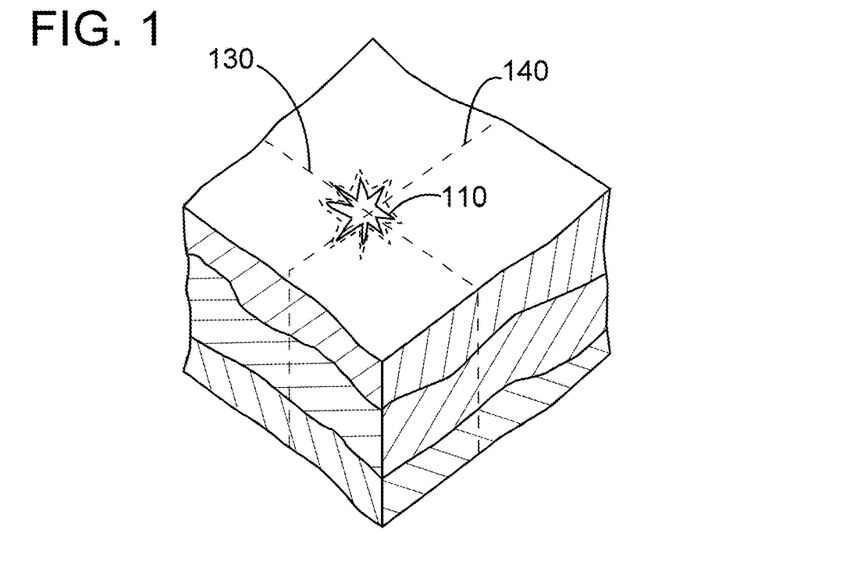
FIG. 1 illustrates an example of a microseismic event and the nodal planes of its associated moment tensor.

FIG. 1 illustrates the occurrence of a seismic or microseismic event 110 along a fault plane. When that microseismic event is detected, the raw data is used to derive the moment tensor M, including the two nodal planes. These two possible fault planes, planes 130 and 140, are mathematically indistinguishable from each other. Thus, either possible fault plane 130 or 140 may be the actual plane along which motion causing the microseismic event has occurred, and analysis of the single event fails to provide any indication as to which of the two nodal planes is the actual fault plane.

The moment tensor is determined by inverting the data received at the receivers monitoring for a microseismic event. A variety of approaches may be used to arrive at the moment tensor M with its nodal planes, a few examples of which are provided herein. However, it will be appreciated that any approach for deriving the moment tensor M is considered within the scope of the present disclosure. In some embodiments, a moment tensor M may be derived using a linear algorithm. For example, upon detection of a microseismic event, the amplitudes of first motions of P-waves or S-waves may be determined at the receivers. That information, coupled with Green's function, may be used to invert the following linear equation to arrive at the moment tensor:

$$u_n(x,t) = M_{p,q} * G_{np,q} \tag{1}$$

where $u_n$ is the n component's amplitude of displacement on a receiver at position x at time t, $M_{p,q}$ is the p, q element of the moment tensor M, and $G_{np,q}$ is the spatial differentiation along the q direction of the np element of the Green's function. Green's function represent the Earth's response to an impulsive force acting at the source location of the microseismic event and propagating to the receiver location. When expanded to an example set of matrix-based linear equations, Equation (1) becomes:

$$\begin{bmatrix} u_1 \\ u_2 \\ \cdots \\ \cdots \\ \cdots \\ u_N \end{bmatrix} = \begin{bmatrix} G_{11,1} & G_{12,2} & G_{13,3} & G_{11,3} & G_{12,3} & G_{11} & G_{12} & G_{13} \\ G_{21,1} & G_{22,2} & G_{23,3} & G_{21,3} & G_{22,3} & G_{21} & G_{22} & G_{23} \\ & & & \cdots & & & & \\ & & & \cdots & & & & \\ & & & \cdots & & & & \\ G_{N1,1} & G_{N2,2} & G_{N3,3} & G_{N1,3} & G_{N2,3} & G_{N1} & G_{N2} & G_{N3} \end{bmatrix} \begin{bmatrix} M_{11} \\ M_{22} \\ M_{33} \\ M_{12} \\ M_{13} \\ M_{23} \end{bmatrix} \tag{2}$$

where the elements of M may be solved for. Because the moment tensor is a symmetric tensor, there are only six independent components of M, as $M_{12}$ is equal to $M_{21}$, $M_{13}$ is equal to $M_{31}$ and $M_{23}$ is equal to $M_{32}$. If there are more than five receivers as data points for the function u, the moment tensor is over determined.

The derivation of a moment tensor M may also be determined using a non-linear inversion of the raw data detected at receivers to arrive at the moment tensor M. This may be accomplished in a similar manner to the linear inversion described above. However, when there is insufficient raw data to complete the linear inversion or the raw data is weak or otherwise difficult to measure precisely, a non-linear approach can be used. While there are a variety of non-linear approaches that may be used, one example is simply research, where all possible moment tensors are compared to the observed data to determine whether the possible moment tensor matches the observed data. When a possible moment tensor is found that matches the observed data, the moment tensor has been derived. Stated another way, some values for u may be modeled based on the microseismic event position, Green's function, and a theoretical moment tensor. A minimization is then performed to fit the observed amplitudes and the modeled amplitudes by varying the moment tensor over the moment tensors that are possible based on the observed raw data.

Figure 2:
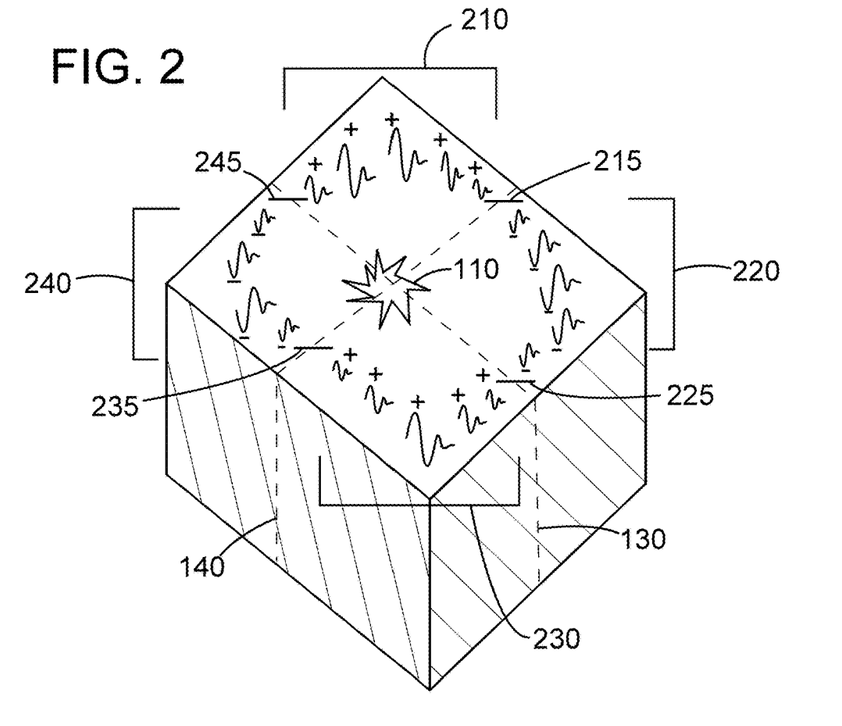
FIG. 2 illustrates an example of the first motions detected in association with a microseismic event, in accordance with some embodiments of the present disclosure.

FIG. 2 illustrates the microseismic event of FIG. 1 with a visual depiction of the positive and negative amplitudes of the first motions detected at a variety of locations around the microseismic event. FIG. 2 also illustrates the nodal planes. As shown in FIG. 2, signals associated with microseismic event 110 are depicted around microseismic event 110. Each signal shown represents the first motions recorded at a receiver in conjunction with microseismic event 110. As can be seen, there are four quadrants, quadrants 210, 220, 230, and 240, with signals that are detected. At the borders of the quadrants are locations where no signal is recorded for the microseismic event, for example, at locations 215, 225, 235 and 245. In quadrants 210 and 230, the first motions have a positive value, and correspond to a dilatational force. At the center of quadrants 210 and 230, the first motions have a maximum amplitude. Proceeding out towards the nodal planes, the signal amplitudes slowly decrease until they cross the threshold into a negative value. In quadrants 220 and 240, the first motions have a negative value, and correspond to a tensile force. Similar to quadrants 210 and 230, at the center of quadrants 220 and 240 the first motions have a maximum amplitude and decrease in magnitude as they approach the nodal planes.

Figure 3:
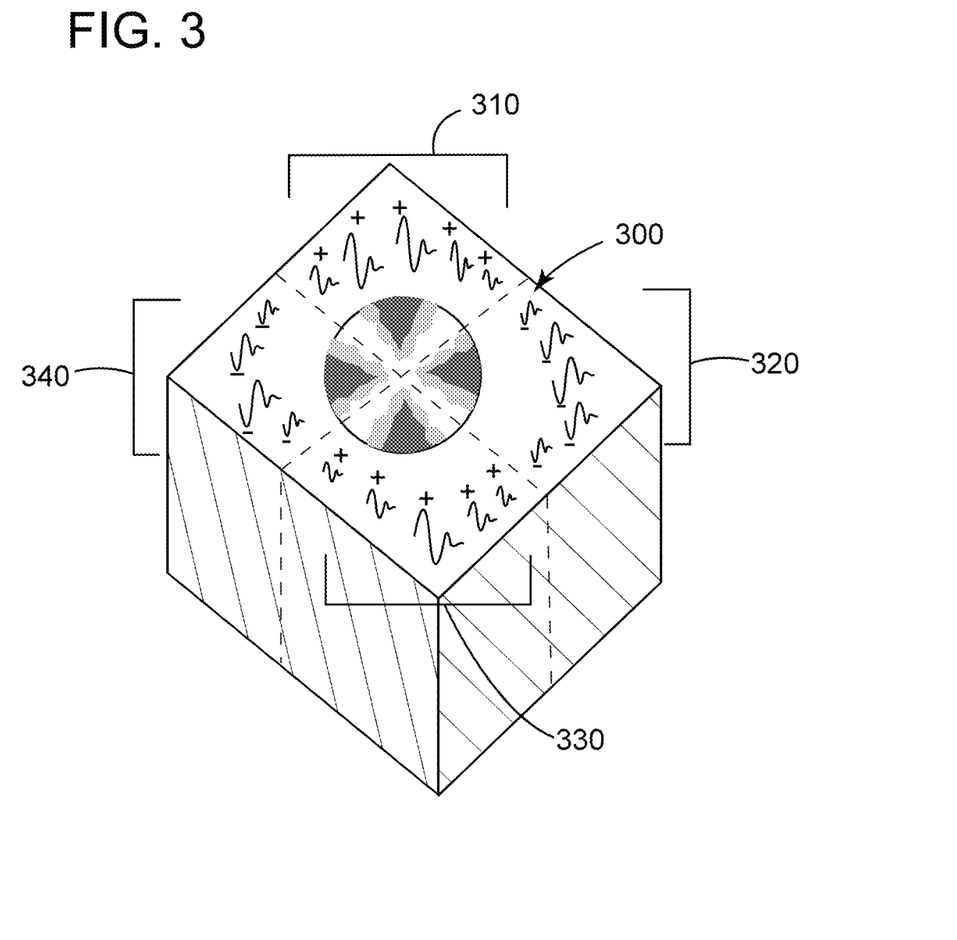
FIG. 3 illustrates an example of the focal mechanism of a microseismic event, in accordance with some embodiments of the present disclosure.

FIG. 3 illustrates a visual depiction of the moment tensor for the microseismic event of FIG. 1 overlaid on the signals from FIG. 2. The visual depiction of the moment tensor as shown in FIG. 3 is a diagram of the compressive and dilatational forces, which necessarily includes the nodal planes as the transition between the compressive and dilatational forces. As shown in FIG. 3, diagram 300 also includes four quadrants, quadrants 310, 320, 330, and 340 that correspond to the signals detected in quadrants 210, 220, 230, and 240 of FIG. 2. Quadrants 310 and 330 include compressive forces and the darker shading indicates an increased magnitude. As the nodal planes are approached, the magnitude of the compressive force approaches zero. Quadrants 320 and 340 include tensile forces, with the darker shading again indicating an increased magnitude with the magnitude decreasing as the nodal planes are approached.

Figure 4:
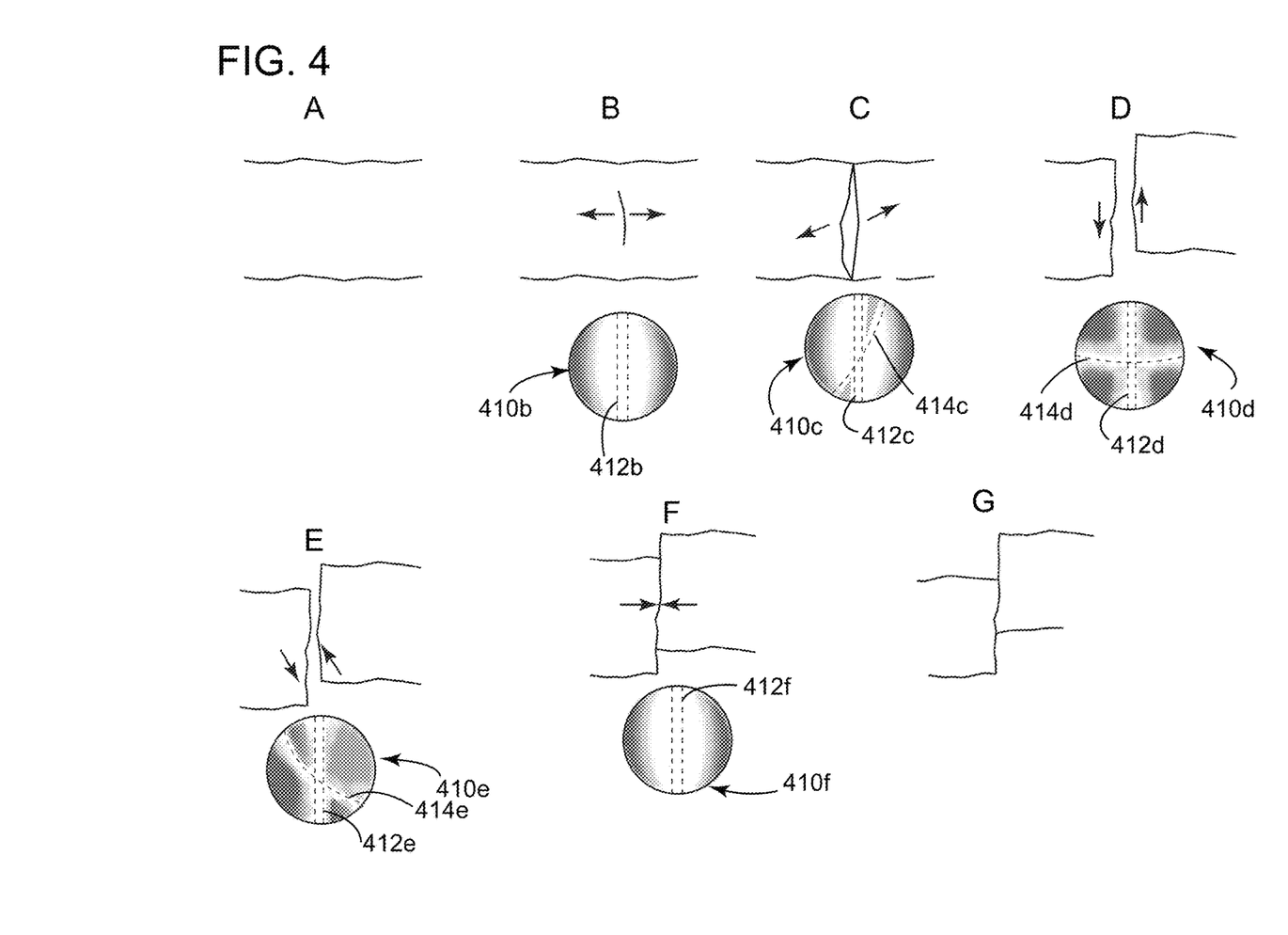
FIG. 4 illustrates an example of a visual depiction of the microseismic events during progression of a fracture and the corresponding moment tensor and associated nodal planes, in accordance with some embodiments of the present disclosure.

FIG. 4 illustrates an example of visual depictions of moment tensors over time in parallel with the progression of a fracture for a series of microseismic events at different points in time A-G. For example, the progression of the fracture may represent the progression of the opening and eventual closing of a fracture in hydraulic fracturing. At time point A, no fracture has started to form and so no moment tensor is present as there is no microseismic event. At time point B, a fracture is just beginning to open. The initial opening of a fracture is a pure tensile event and the double couple component of the moment tensor for such an event is zero. However, such an event is not detectable as it is a pure tensile event with only dilatational forces. It is illustrated here only for convenience in describing the formation of the fracture and in illustrating conceptually the progression of the nodal planes. If such an event could be detected, it would have a moment tensor 410b with only a single nodal plane 412b. This nodal plane is drawn with double dashed lines to indicate that it corresponds to the actual fault plane. This event has a purely non-double couple moment tensor.

At time point C, the fracture is continuing to open further, but slippage along the fault is also beginning to occur. For such a microseismic event, there are both double couple and non-double couple components of the moment tensor. Because of the variation in forces experienced, described by the combination of double-couple and non-double couple components, the nodal planes 412c and 414c of moment tensor 410c are non-orthogonal. Nodal planes 412c and 414c are illustrated as the intersection of the regions of dilatational and compressive forces. As can be seen by comparing the nodal planes 412b and 412c in the visual depiction, nodal planes 412b and 412c of the microseismic events at time point B and time point C are the same. For the convenience in describing FIG. 4, the nodal plane corresponding to the actual fault plane is illustrated with double-dashed lines, while the other nodal planes are illustrated with single-dashed lines. It will be appreciated that this is done for convenience in understanding the principle illustrated herein, and that the two nodal planes viewed in abstract at a single point are indistinguishable as to the actual fault plane.

At time point D, the fracture has finished opening and a pure slippage event is observed. For such a microseismic event, the moment tensor has only a double-couple component, as there is no volume change or outward motion on the fault. As can be seen from moment tensor 410d, nodal planes 412d and 414c are orthogonal. Also, as can be seen by comparing nodal plane 412d with nodal planes 412c and 412b, nodal plane 412d is the same as nodal planes 412c and 412b.

At time point E, the fracture has started closing and slippage is still occurring. For such a microseismic event, there are both double couple and non-double couple components of the moment tensor. Similarly to the moment tensor at time point C, nodal planes 412e and 414e of moment tensor 410e at time point E are non-orthogonal. As can be seen, nodal plane 412e is the same as nodal planes 412d, 412c, and 412b.

At time pointe F, the fracture is at the final instant of closing. Such a microseismic event is also a purely tensile event, but rather than having only dilatational forces, only compressive forces are experienced. As with the microseismic event shown at time point B, the microseismic closure event at time point F is not detectable and is illustrated only for the purpose of completeness in picturing the progression of the fracture and the nodal planes. However, it is shown that nodal plane 412f of moment tensor 410f is the same as nodal planes 412b, 412c, 412d, and 412e. At time point G, the fracture has completely closed and no microseismic event is occurring.

By observing or determining the nodal plane that is common or the same among a family of microseismic events, the actual solution fault plane is determined. For example, if the microseismic events at time points C and E were detected and the moment tensors were derived with their corresponding nodal planes, it is observed that nodal planes 412e and 412c are the same, and thus, this common nodal plane is the actual solution fault plane. While an entire progression is shown in FIG. 4, this is an ideal situation and it will be appreciated that not all of these microseismic events may occur or may be detected. The progression illustrated in FIG. 4 is only for the convenience of visually depicting the progression of a fracture and the associated nodal planes. Further, the progression is a continuum and only snapshots in time have been shown. In practice, only a limited number of the microseismic events in this continuum may be detected. For example, one or two microseismic events around time point C and another one or two around time point D may be detected. The present disclosure contemplates using such a family of microseismic events to determine the actual fault plane from the nodal planes.

Figure 5:
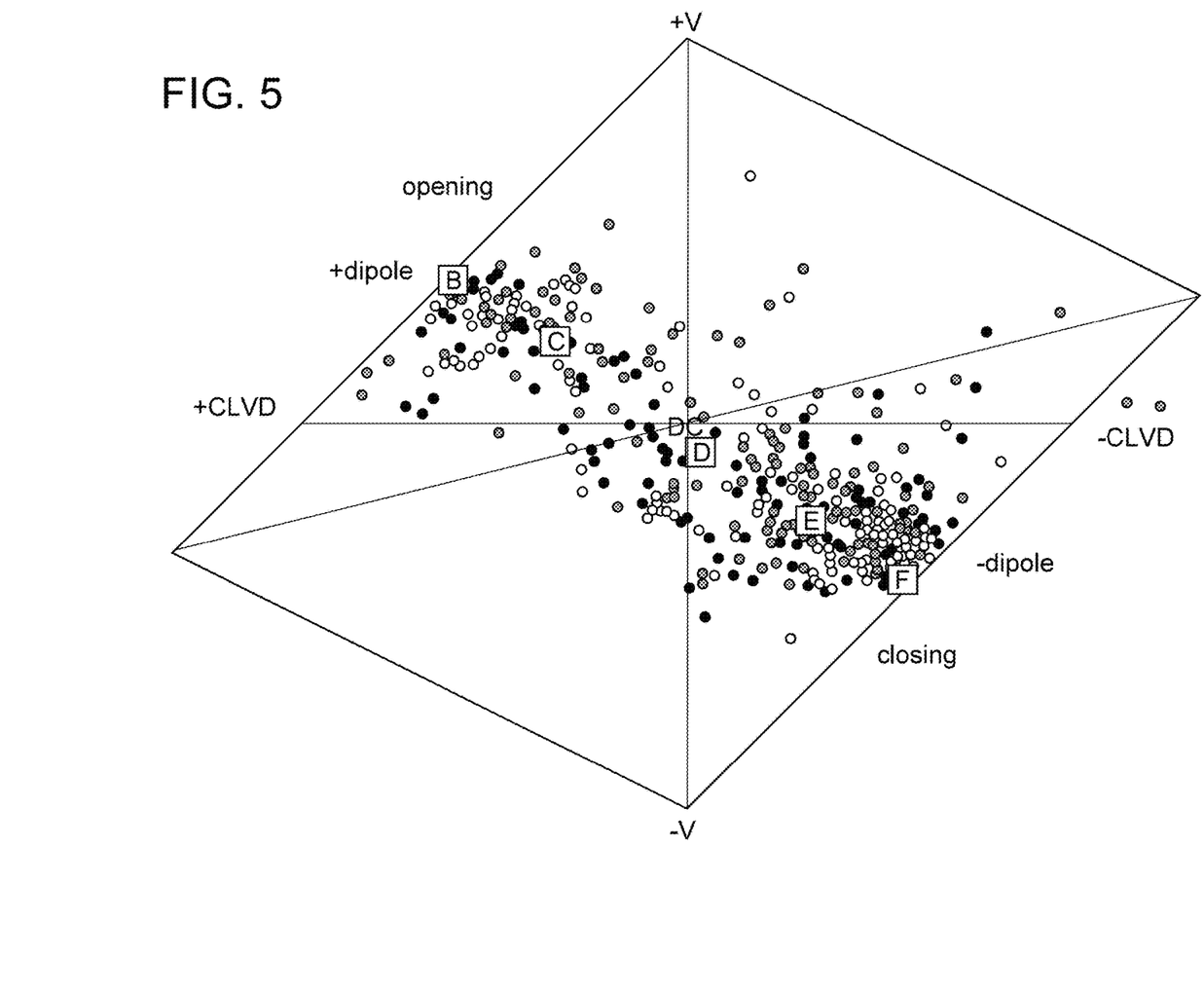
FIG. 5 illustrates an example of a plot showing the distribution of the events of FIG. 4, in accordance with some embodiments of the present disclosure.

FIG. 5 illustrates an example of a plot showing the distribution of the events of FIG. 4. The plot of FIG. 5, sometimes referred to as a Harrison plot, depicts spatially the proportion of a moment tensor that is a non-double couple component. In the center of the plot are completely double-couple component microseismic events, where the non-double couple portion is zero. At the outer periphery of the plot are completely non-double couple microseismic events with the double-couple portion being zero. At the top of the plot are completely positive isotropic events (+V), or in other words an explosion where all forces are dilatational. At the bottom of the plot are completely negative isotropic events (−V), or in other words an implosion where all forces are compressive. The moment tensors for these two extremes do not have nodal planes, as all forces are either dilatational for +V events or compressive for −V events. Thus, there is no transition between the two creating a nodal plane, nor any region where the force is zero as the events are either expanding (+V) or contracting (−V) in all directions. At the far left and far right of the plot are compensated linear vector dipole (CLVD) events, both positive and negative, which are experienced with volcanic activity. As shown in FIG. 5, between +CLVD events and +V events are fracture opening and positive dipole events, or in other words, only dilatational forces along a single axis. On the opposite side of the plot between −CLVD and −V events are fracture closing events or negative dipole events, or in other words, only compressive forces along a single axis. The nodal plane is then the plane that the axis of the force is normal to (for example, if the forces were along the x-axis the nodal plane would by the y-z plane).

In FIG. 5, the microseismic event shown at time point B of FIG. 4 is a fracture opening event, occurring in the upper left region of the plot and being entirely a non-double couple moment tensor. For the microseismic event at time point C, the moment tensor has both double-couple and non-double couple components, and thus, the nodal planes are non-orthogonal. As shown in FIG. 4, the fracture is still opening and thus, the non-double couple portion is in the positive region of the plot as the forces are predominantly dilatational. The microseismic event at time point D has a purely double-couple moment tensor with orthogonal nodal planes. As there is no volume change for such a microseismic event, this point occurs in the center of the plot. The moment tensor for the microseismic event at time point E has both double-couple and non-double couple components, and thus, the nodal planes are non-orthogonal. As shown in FIG. 4, the fracture is closing and thus, the non-double couple portion is in the negative region of the plot as the forces are predominantly compressive. At time point F, the fracture is closing and the microseismic event has a purely non-double moment tensor with purely compressive forces along a single axis.

For purposes of the present disclosure, the data points of FIG. 5 of interest will be those generally following the wide path progressing from time point B to time point F. As described above, points falling outside of this region are likely caused by some other mechanism besides microseismic events along a fault (for example, an explosion or volcanic activity).

To determine whether a microseismic event belongs in a family of microseismic events for the purposes of comparing its nodal planes to those of the other family members, the proximity of events to each other is examined. Whether microseismic events are in close enough proximity to each other to be occurring along the same fault and thus be in the same family depends on the magnitude of the microseismic event. The length of a fault typically limits the magnitude of seismic or microseismic events which may occur along that fault. Thus, for example, a longer fault will have larger magnitude events while a smaller fault will have lower magnitude events. For a group of microseismic events occurring in quick succession and close proximity, often only the largest magnitude event of the group will be considered as smaller magnitude events may still occur along large faults. One example of the magnitude of events typically seen for a certain size of fault may be that for a fault of approximately one hundred meters in length, most microseismic events will be of a magnitude of approximately negative two on the Richter scale or smaller. As a few other examples of proximity, for hydraulic fracturing, events within approximately a few tens of meters, or even one hundred meters of each other may be considered part of a family, corresponding to the formation of smaller fractures. For large reservoirs of several kilometers in length, events may be within a few hundred meters of each other and still be considered part of a family, corresponding to the formation of large fractures or preexisting faults. While a few examples have been given, it will be appreciated that a family can be expanded or contracted geographically if no common nodal plane is found among the family of events or if multiple common planes are found. Further, it will be appreciated that this relationship is approximate and can vary.

The location of a microseismic event may be determined by any of a variety of methods. Examples of determining location may be provided, but it will be appreciated that any method of determining the location of a microseismic event may be used and will be within the scope of the present disclosure. One example of determining the location of the microseismic event includes picking P-wave arrival times at a plurality of receivers and, using a velocity model, extrapolating the distance to the origin of the microseismic event based on travel times. As the coverage of receivers increases, the location of an event can be determined with greater accuracy. Determining location may also use more complex signal processing like stacking of seismic wave data from more than one receiver to strengthen the signal associated with the seismic wave and arrive at the location with the highest signal strength. Beam-forming (a signal processing technique that uses phased arrays of receivers for constructive interference at certain angles and destructive interference at other angles to strengthen a desired signal) or other signal processing techniques can also be used. While the actual process to detect the location of the microseismic is not important, it will be appreciated that it is desirable for the resolution of location to be at least commensurate in scope with the desired proximity. In other words, if the family of events are of a magnitude that a fault size of one hundred meters is expected, it may be desirable to resolve the location of the microseismic event to within one hundred meters.

Figure 6:
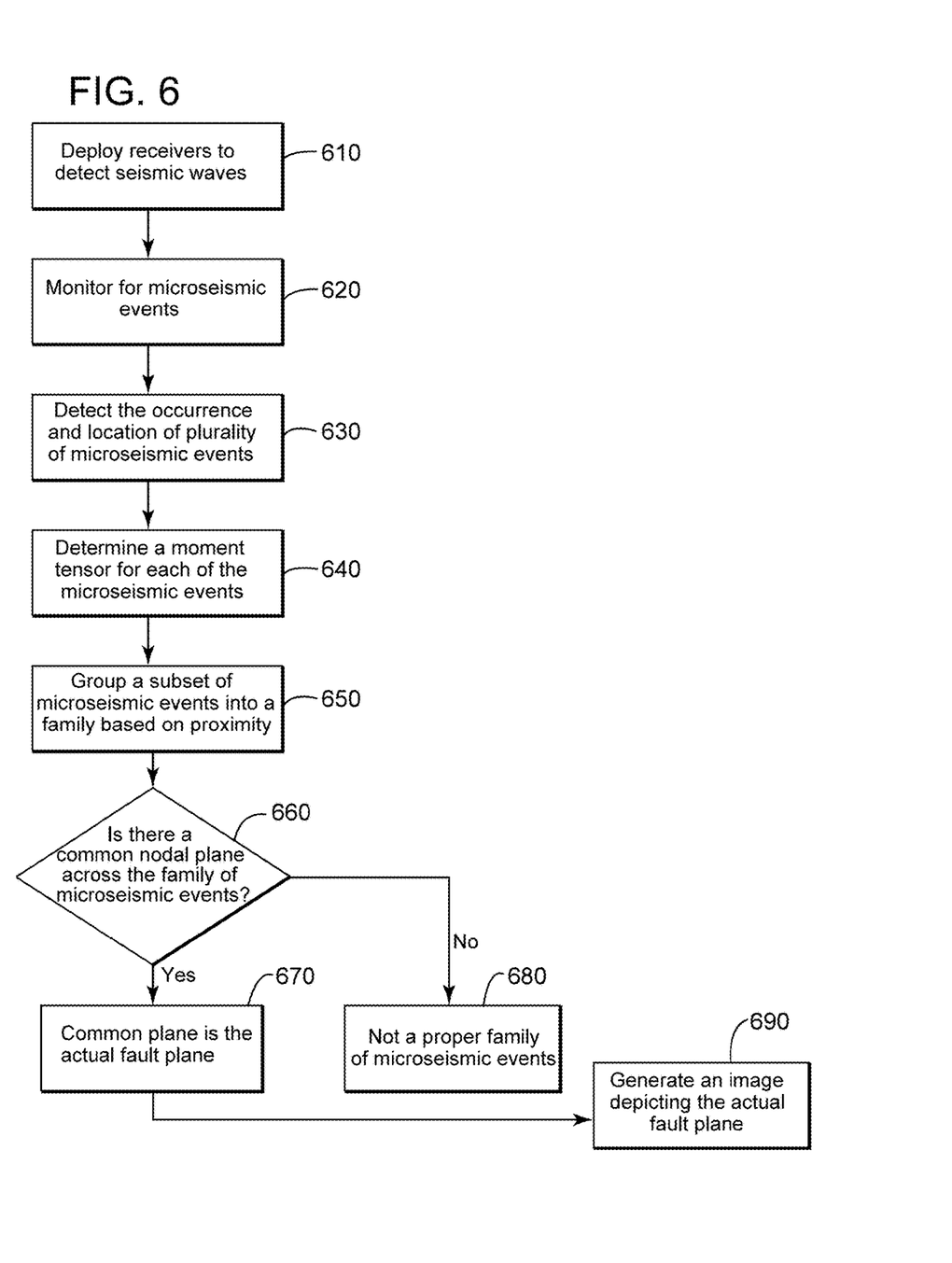
FIG. 6 illustrates an example of a process to determine a solution fault plane, in accordance with some embodiments of the present disclosure.

FIG. 6 illustrates an example flowchart of a process indicating steps to determine the actual fault plane, in accordance with the present disclosure. At step 610, receivers are deployed to detect seismic waves. At step 620, the receivers monitor for microseismic events. At step 630, the receivers detect the occurrence and location of a plurality of microseismic events. As described above, the occurrence and location of the microseismic event may be detected by the arrival of seismic waves at the receivers. Further, any method of determining the location of the microseismic event may be used.

At step 640, a moment tensor for each of the microseismic events is determined. As described above, this may be accomplished using a linear algorithm or a non-linear algorithm to determine the moment tensor. In each case, the raw data is inverted using the Green's function to arrive at the moment tensor. Each moment tensor M for the plurality of microseismic events will also have a corresponding pair of nodal planes.

At step 650, a subset of the plurality of microseismic events is grouped into a family of microseismic events based on proximity to each other. Microseismic events that are close enough to each other to likely have occurred along the same fault plane will be included. If this location is imprecise, a range may be used for the location of an event and either end of the range may signify proximity to another event. Proximity of a family of events may also be dependent on magnitude, as described above. For example, microseismic events of a magnitude roughly negative two on the Richter scale and occurring along the same fault are likely to be within one hundred meters of each other.

At step 660, once the family of microseismic events with their corresponding moment tensors and nodal planes are collected, the nodal planes across the family of microseismic events are compared. This may be done visually by comparing the diagram of moment tensors of the microseismic events using a graphical depiction of the nodal planes, for example, using diagrams of moment tensors like those shown in FIG. 4. This may also be done numerically by comparing the mathematical representation of the nodal planes. If a common nodal plane is found across the entire family, the process proceeds to step 670 where the common nodal plane found among the family of microseismic events is determined to be the fault plane along which the motion has occurred. If there is not a common nodal-plane among the family of microseismic events, the process proceeds to step 680 where it is determined that the family is not a proper family of microseismic events. This may be because there are outlying microseismic events, because assumptions used in determining the location or moment tensor are invalid, or because multiple faults within the proximity used to group the family are present.

At step 690, an image depicting the actual fault plane may be generated. This image may also include other seismic information, for example, the image may depict subsurface formations or layers proximate the actual solution fault plane. The image may also depict the subsurface formations or layers being fractured along the fault plane. In some embodiments, the fault plane may be overlaid on an image depicting a plurality of faults in a monitored region.

While the process described in FIG. 6 has been shown in a linear fashion, it will be appreciated that the steps may be done in a different order and some steps may be omitted. For example, steps 640 and 650 may be done in reverse order. As another example, steps 610, 620, and 630 may be omitted for modeled data or in circumstances where seismic data has already been collected. As an additional example, step 690 may be omitted.

Figure 7:
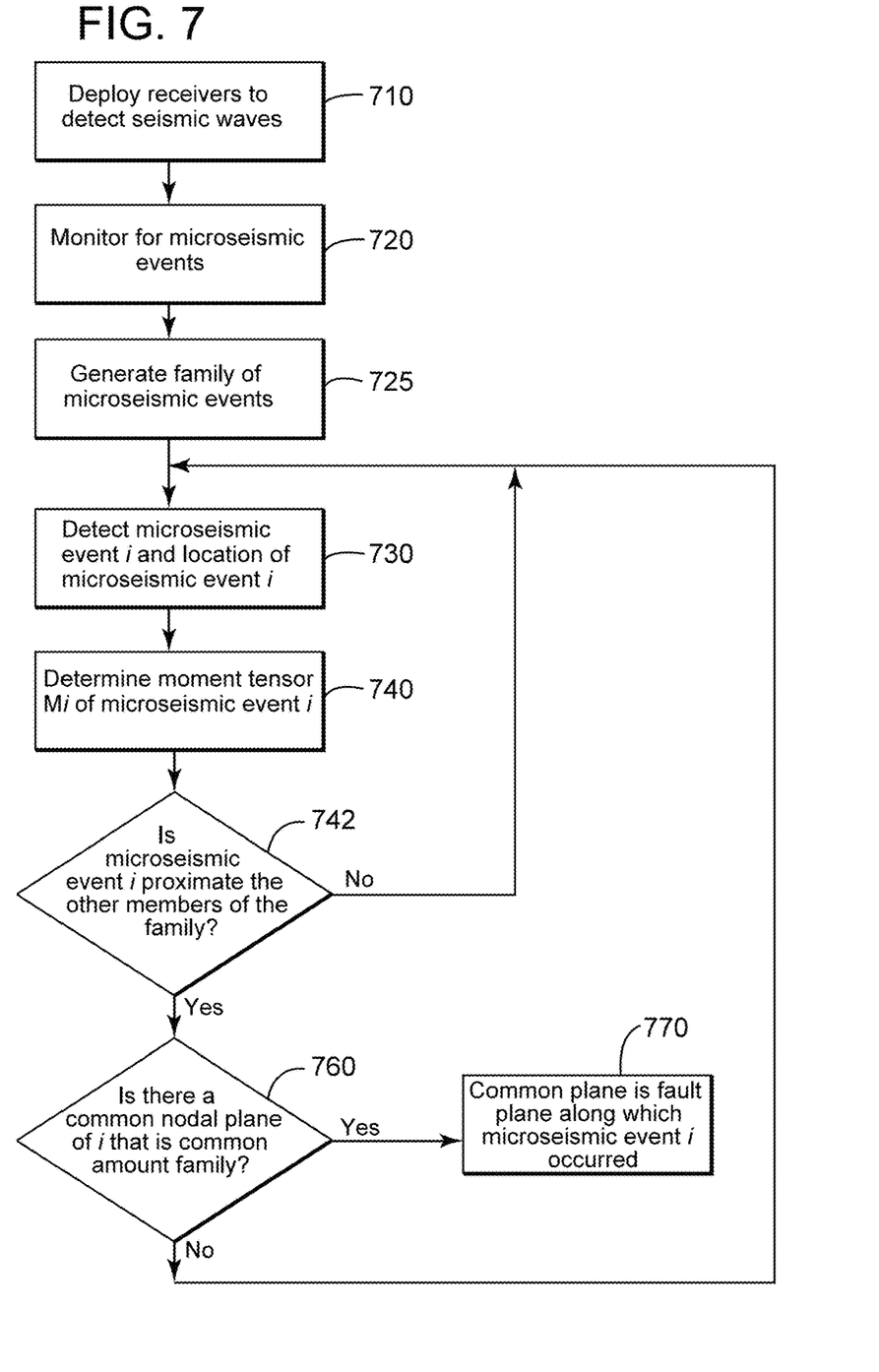
FIG. 7 illustrates an alternative example of a process to determine a fault plane for a given microseismic event, in accordance with some embodiments of the present disclosure.

FIG. 7 illustrates an alternative example of a flowchart showing steps in a process to determine the solution fault plane for a given microseismic event. The flowchart shown in FIG. 7 may also be used to determine if a microseismic event should be grouped with a family of microseismic events.

At step 710, receivers are deployed to detect seismic waves and at step 720, the receivers monitor for microseismic events. Steps 710 and 720 are similar to steps 610 and 620 of FIG. 6. At step 725, a family of microseismic events is generated. This may occur in a similar manner to the grouping of a family of microseismic events as described with respect to FIG. 6. Each of the microseismic events of the family has an associated moment tensor and nodal planes. The moment tensors and associated nodal planes for the family of microseismic events can be determined as part of the generation of the family.

At step 730, the receivers detect a microseismic event i and the location of microseismic event i. The location of microseismic event i may be found in a similar manner to the detection of location performed at step 630 of FIG. 6. At step 740, the moment tensor $M_i$ of microseismic event i may be determined with its associated nodal planes. This may be done in a manner similar to that described at step 640 of FIG. 6.

At step 742, it is determined whether microseismic event i is proximate the other microseismic events in the family generated in step 725. As described previously, if microseismic event i is within a close enough distance to the other microseismic events of the family, there is a likelihood that it has occurred along the same fault. This determination may include consideration of the magnitude of microseismic event i or the microseismic events of the family.

At step 760, it is determined whether one of the two nodal planes of microseismic event i is common with a nodal plane that is common to the family. In some embodiments, a single solution fault plane will have already been determined for the family and the nodal planes of microseismic event i will simply be compared to the solution plane to determine if the microseismic event belongs in the family. Alternatively, the nodal planes of microseismic event i may be compared with all of the nodal planes across the entire family. If a common nodal plane is found, the process proceeds to step 770. At step 770, microseismic event i as added to the family and the common nodal plane is determined to be the fault plane along which microseismic event i occurred. If a common nodal plane is not found, microseismic event i is not added to the family and the process returns to just before step 730 where another microseismic event can be detected and determined if it belongs to the family. The process illustrated in FIG. 7 may allow the exclusion of certain microseismic events from a family of other microseismic events occurring in a certain geographical area.

Figure 8:
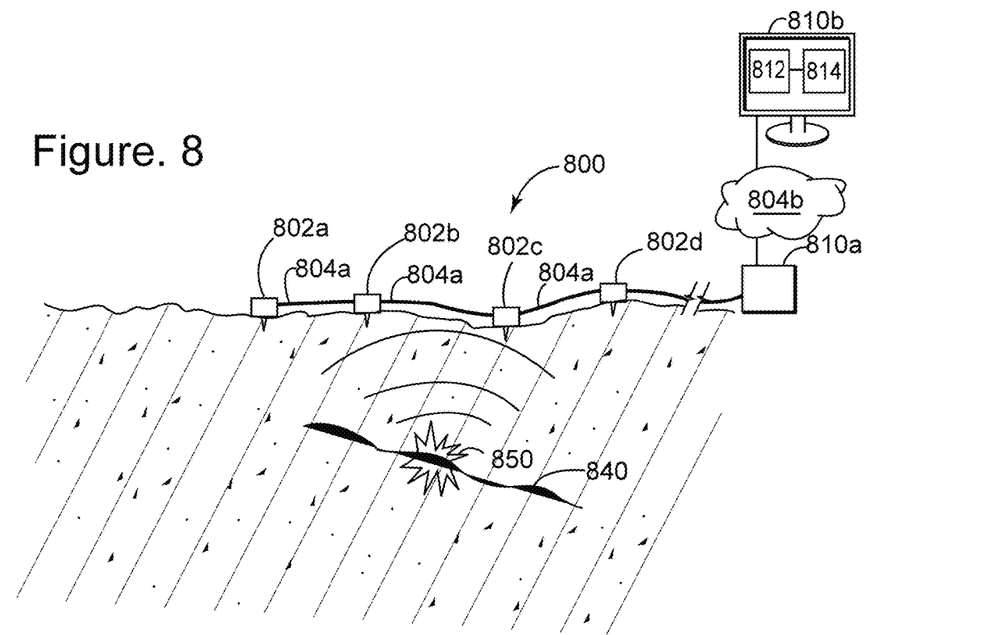
FIG. 8 illustrates an example of a microseismic monitoring system, in accordance with some embodiments of the present disclosure.

FIG. 8 illustrates an example of a microseismic monitoring system 800 that may be utilized to detect microseismic events, generate raw data associated with microseismic events, and perform the data processing necessary to arrive at a solution fault plane, in accordance with some embodiments of the present disclosure. System 800 may be any collection of systems, devices, or components configured to detect, record, or process data associated with a microseismic event. For example, system 800 may include one or more receivers (for example receivers 802*a*-802*d*) communicatively coupled to one or more computing devices 810 via one or more networks 804*a* and 804*b*. A plurality of receivers 802*a*-802*d* may be connected by a first network 804*a*. First network 804*a* may connect receivers 802*a*-802*d* with a first computing device 810*a*. First computing device 810*a* may be connected to a second computing device 810*b* via a second network 804*b*. System 800 may monitor for a microseismic event, for example, microseismic event 850 along fault 840, and may measure or sense data associated with microseismic event 850. System 800 may additionally process data associated with microseismic event 850. For example, system 800 may use the raw data associated with microseismic event 850 to determine the moment tensor of microseismic event 850 with its associated nodal planes.

System 800 monitors for microseismic events within subsurface formations. As used herein, a subsurface formation may refer to a single rock layer or a collection of rock layers. A subsurface formation may also refer to a particular arrangement of rock layers, which may include some particular feature within the rock layers. For example, a subsurface formation may include a trap or other feature where hydrocarbons have collected in a pool or reservoir. A subsurface formation may also include one or more rock layers containing a producing well, an observation well, a hydraulic fracturing well, or any other feature to access or observe a subsurface formation.

System 800 uses one or more receivers to detect or measure information regarding a microseismic event. Receivers 802*a*-802*d* may be located on or proximate to the surface of the earth within an area being monitored for microseismic events. Receivers 802*a*-802*d* may be any type of instrument that is utilized to transform seismic energy or vibrations into a readable signal. For example, receivers 802*a*-802*d* may be geophones configured to detect or record energy waves from microseismic event 850 and convert the mechanical motion experienced at the receiver into an electrical signal. Receivers 802*a*-802*d* may also be accelerometers that sense the change in acceleration at receivers 802*a*-802*d* due to microseismic event 850 and convert that change in acceleration to an electrical signal. Receivers 802*a*-802*d* may also be optical devices or optical geophones, for example, distributed acoustic sensing (DAS) devices. In such an embodiment, receivers 802*a*-802*d* output a digital signal representative of the optical phase in an interferometer, which varies in response to mechanical motion. Receivers 802*a*-802*d* may comprise vertical, horizontal, or multicomponent receivers. For example, receivers 802*a*-802*d* may be multicomponent receivers like three component (3C) geophones, 3C accelerometers, or 3C Digital Sensor Units (DSU).

Receivers 802*a*-802*d* may be configured to detect P-waves or S-waves. A P-wave may be referred to as a primary wave, pressure wave, longitudinal wave, or compressional wave. A P-wave may be referred to as a primary wave because a P-wave may be the first wave to arrive at a particular receiver 802 after a microseismic event has occurred. P-waves may propagate with particle motion perpendicular to the wavefront from microseismic event 850. An S-wave may be referred to as a shear wave or secondary wave. S-waves may be polarized in the horizontal plane (classified as SH waves) and in the vertical plane (classified as SV waves).

Multiple receivers 802*a*-802*d* may be utilized within an area to provide data related to multiple locations and distances from microseismic event 850. Receivers 802*a*-802*d* may be positioned in multiple configurations, such as linear, grid, array, or any other suitable configuration. In some embodiments, receivers 802*a*-802*d* may be positioned along one or more strings, which may be part of network 804*a*. Each receiver may be spaced apart from adjacent receivers in the same string. Spacing between receivers in a string may be approximately the same preselected distance, or span, or spacing may vary depending on a particular application, area topology, or other suitable parameter.

System 800 uses receivers 802*a*-802*d* to record or measure microseismic event 850 along fault 840. Fault 840 may include any fracture or discontinuity in a subsurface formation along which there may be movement. For example, due to friction and rigidity of rock, stresses may build in rock until they exceed a strain threshold, and motion along fault 840 may occur. The motion may be large and noticeable, for example, large earthquakes. However, the motion may also be small and imperceptible to the average human. These smaller motions may be referred to as microseismic events of which event 850 is an example, and may be as low as negative six on the Richter scale. However, microseismic event 850 may also be significantly larger, for example, around two or three on the Richter scale or even larger. In some circumstances, multiple microseismic events occur along fault 840. These may occur simultaneously, in quick succession, or over a delayed period of time.

Computing devices 810*a* and 810*b* may include any instrumentality or aggregation of instrumentalities operable to compute, classify, process, transmit, receive, store, display, record, or utilize any form of information, intelligence, or data. For example, computing devices 810a and 810b may comprise a personal computer, a storage device, or any other suitable device and may vary in size, shape, performance, functionality, and price.

Computing devices 810a and 810b may include a processing unit 812 and a memory unit 814. For example, computing devices 810a and 810b may include random access memory (RAM), one or more processing resources such as a central processing unit (CPU) or hardware or software control logic, other types of volatile or non-volatile memory, or any combination of the foregoing. Additional components of computing devices 810a and 810b may include one or more disk drives, one or more network ports for communicating with external devices, various input and output (I/O) devices, such as a keyboard, a mouse, and a video display. Computing devices 810a and 810b may be located in a station truck, a drilling platform, or any other suitable enclosure. Computing devices 810a and 810b may be configured to permit communication over any type of network, such as a wireless network, a local area network (LAN), a wide area network (WAN) (for example, the Internet), or any combination thereof.

Processing unit 812 may comprise any system, device, or apparatus operable to interpret program instructions, execute program instructions, process data, or any combination thereof. For example, processing unit 812 may execute instructions to determine a moment tensor with its associated nodal planes from raw data of microseismic event 850. Processing unit 812 may include, without limitation, a microprocessor, microcontroller, digital signal processor (DSP), application specific integrated circuit (ASIC), or any other digital or analog circuitry configured to interpret program instructions, execute program instructions, process data, or any combination thereof. In some embodiments, processing unit 812 may interpret program instructions, execute program instructions, or process data stored in memory 814, storage resources, another component of computing device, or any combination thereof.

Memory unit 814 may be communicatively coupled to processing unit 812 and may comprise any system, device, or apparatus operable to retain program instructions or data for a period of time (for example, computer-readable media). Memory unit 814 may comprise random access memory (RAM), electrically erasable programmable read-only memory (EEPROM), a PCMCIA card, flash memory, magnetic storage, opto-magnetic storage, or any suitable selection or array of volatile or non-volatile memory that retains data after power to computing device 810b is turned off.

In some embodiments, computing devices 810a and 810b may be located in close proximity to each other, or may be remotely located from each other. Computing devices 810a and 810b may also vary greatly in their type, components, or make-up, but need not do so. For example, computing device 810a may be a simple computing device primarily configured to collect raw data from receivers 802a-802d and provide the data to computing device 810b. Alternatively, computing device 810b may be a super-computer configured to perform exhaustive, complex, multi-variable and multi-dimensional computation and processing.

Network 804a may provide wire-line transmission between receivers 802a-802d and computing device 810a. Computing device 810a may then be in communication with computing device 810b via network 804b, which may be via wire-line or wireless transmission. It may also be described that receivers 802a-802d are communicatively coupled with computing device 810b. For example, they may be coupled through networks 804a and 804b and computing device 810a. Computing devices 810a and 810b can be described as a single computing device.

For the purposes of this disclosure, the term "wire-line transmissions" may be used to refer to all types of electromagnetic or optical communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic or optical signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, or any other suitable medium.

For the purposes of this disclosure, the term "wireless transmissions" may be used to refer to all types of electromagnetic communications that do not require a wire, cable, or other types of conduits. Examples of wireless transmissions which may be used include, but are not limited to, personal area networks (PAN) (for example, BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, for example IEEE 802.11 and BLUETOOTH, as well as infra-red, and laser. Examples of wireless transmissions for use in wide area networks (WAN) include, but are not limited to, narrowband personal communications services (nPCS), personal communication services (PCS such as CDMA, TMDA, GSM, UMTS, LTE, etc.) circuit switched cellular, and cellular digital packet data (CDPD), etc.

Networks 804a and 804b may be any instrumentality or aggregation of instrumentalities operable to provide data communication between one or more devices, in one or both directions. Networks 804a and 804b may be implemented as, or may be a part of, a personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data, or messages (generally referred to as data), or any combination thereof. Networks 804a and 804b may transmit data using wireless transmissions, wire-line transmissions, or a combination thereof via any storage protocol, communication protocol, or combination thereof, including without limitation, Fibre Channel, Frame Relay, Asynchronous Transfer Mode (ATM), Internet protocol (IP), Transmission Control Protocol (TCP), Internet Printing Protocol (IPP), other packet-based protocol, or any combination thereof. Networks 804a and 804b and their various components may be implemented using hardware, software, or any combination thereof.

Figure 9:
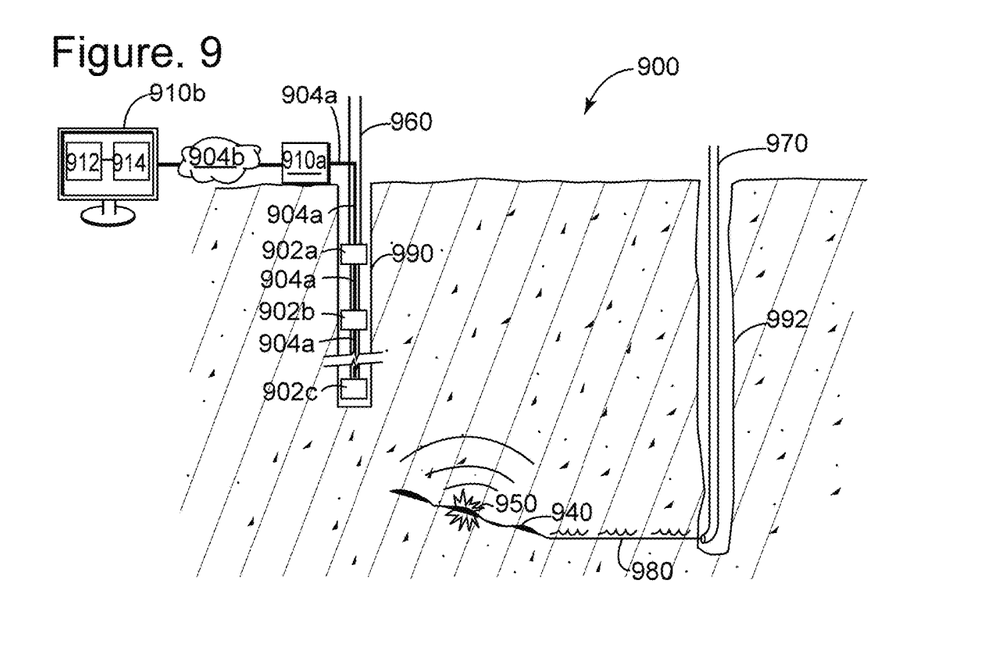
FIG. 9 illustrates an alternative example of a microseismic monitoring system, in accordance with some embodiments of the present disclosure.

FIG. 9 illustrates an alternative example of a microseismic monitoring system 900 for determining a fault plane for a plurality of microseismic events, in accordance with some embodiments of the present disclosure. Similar components having a similar description to those shown in FIG. 8 are present in FIG. 9, and so the written description of those components is not duplicated with an understanding that the same description of these components with respect to FIG. 8 are equally applicable to the components shown in FIG. 9. For example, receivers 802a-802d of FIG. 8 are comparable to receivers 902a-902c of FIG. 9. Networks 804a and 804b are comparable to networks 904a and 904b. Computing devices 810a and 810b are comparable to computing device 910a and 910b.

Microseismic monitoring system 900 shown in FIG. 9 may be one example of a system utilized to monitor, record, or process data associated with microseismic events caused by hydraulic fracturing. As shown in FIG. 9, an injection system 970 may be disposed within a well 992 to facilitate hydraulic fracturing. For example, a high-pressure fluid 980 may be injected into well 992 causing micro-fractures in the subsurface formations. These micro-fractures may occur at or along fault 940 and may result in a microseismic event such as microseismic event 950. As described previously, the opening, expansion, and closing of a fracture can all occur along the same fault 940 and may appear as a series of microseismic events that happen over time.

As shown in FIG. 9, rather than being disposed along the surface of the ground, receivers (for example, receivers 902a-902c) may be disposed within an observation well 990 or other underground location like a mineshaft. Receivers 902a-902c may be attached to a drill string 960, or may be coupled to any other apparatus or device configured to be disposed within an observation well 990. Receivers 902a-902c may also be placed directly upon the rock surface within observation well 990. Receivers 902a-902c may also be permanently cemented into place in observation well 990.

As shown in FIG. 9 and similarly to the arrangement shown in FIG. 8, receivers 902a-902c may be communicatively coupled to computing device 910a via network 904a. Computing device 910a may be communicatively coupled with computing device 910b via network 904b. Computing devices 910a and 910b and network 904b may be collapsed into a single computing device.

Determining fault plane 940 during hydraulic fracturing may provide for a detailed view of the progress and profile of micro-fractures during the hydraulic fracturing process. This may allow oil and gas well operators insight into evaluation of the micro-fractures as well as optimization of the hydraulic fracturing process. For example, the oil or gas well operator may be able to characterize the induced micro-fracture structure and distribution of conductivity within a subsurface formation containing oil or gas, based at least in part on the location of fault planes 940. Understanding the location and structure of fault planes or micro-fractures may also facilitate an understanding of the distribution of fracture conductivity, which may facilitate a reservoir model of the oil or gas well that can accurately predict well performance.

The present disclosure may refer to a computer-readable medium as storing instructions, for example, for determining a moment tensor or finding a common nodal plane. For the purposes of this disclosure, computer-readable media may include any instrumentality or aggregation of instrumentalities that may retain data or instructions for a period of time. Computer-readable media may include, without limitation, storage media such as a direct access storage device (for example, a hard disk drive or floppy disk), a sequential access storage device (for example, a tape disk drive), compact disk, CD-ROM, DVD, random access memory (RAM), read-only memory (ROM), electrically erasable programmable read-only memory (EEPROM), flash memory, or any combination of the foregoing.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

What is claimed is:

1. A method of using passive seismic data, the method comprising:
    determining a moment tensor for each of a plurality of microseismic events using an inversion algorithm on raw data detected at a plurality of receivers at a fracking site, each of the moment tensors including two nodal planes;
    grouping a subset of the plurality of microseismic events into a family of microseism is events;
    determining whether the family of microseismic events include a single plane that is common across each of the nodal planes of the microseismic events for the moment tensors of the family of microseismic events;
    selecting a solution fault plane for the family of microseismic events, the solution fault plane being the single plane; and
    outputting information for optimizing a fracking operation in view of the solution of the fault plane.

2. The method of claim 1, wherein grouping a subset of the plurality of microseismic events into a family of microseismic events comprises:
    determining a location for each of the plurality of microseismic events; and
    selecting microseismic events of the plurality of events that occurred proximate each other as members of the family of microseismic events.

3. The method of claim 2, wherein the family of microseismic events are within approximately one hundred meters of each other.

4. The method of claim 1, further comprising:
    determining another moment tensor including two nodal planes for another microseismic event;
    verifying that the another microseismic event was proximate the family of microseismic events; and
    determining whether one of the nodal planes of the another moment tensor is common with the solution fault plane; and
    upon a determination that one of the nodal planes is common with the solution fault plane, adding the another microseismic event to the family of microseismic events.

5. The method of claim 1, wherein the inversion algorithm is a linear moment tensor inversion algorithm.

6. The method of claim 1, wherein the inversion algorithm is a non-linear moment tensor inversion algorithm.

7. The method of claim 1, wherein at least two of the moment tensors of the microseismic events of the family of microseismic events include non-double couple components.

8. The method of claim 1, wherein the plurality of microseismic events are triggered by hydraulic fracturing.

9. The method of claim 1, further comprising generating an image depicting the solution fault plane.

10. A system comprising:
a plurality of receivers placed at a frackinq site and configured to detect microseismic events;
a network communicatively coupled to the plurality of receivers; and
a computing unit coupled to the plurality of receivers via the network and comprising a processor unit and a memory unit coupled to the processing unit, the memory unit including instructions that, when executed by the processing unit, make the processor to:
receive raw data associated with the microseismic events from the receivers via the network;
determine a moment tensor for each of the microseismic events using an inversion algorithm on the raw data, each of the moment tensors including two nodal planes;
group a subset of the microseismic events into a family of microseismic events;
determine whether the family of microseismic events include a single plane that is common across each of the nodal planes of the microseismic events for the moment tensors of the family of microseismic events;
select a solution fault plane for the family of microseismic events, the solution fault plane being the single plane; and
outputting information related to the solution fault plane to optimize a fracking operation in view thereof.

11. The system of claim 10, wherein the plurality of receivers are one of geophones, accelerometers, or optical receivers.

12. The system of claim 10, further comprising an injection system configured to inject liquid into a wellbore to induce hydraulic fracturing.

13. The system of claim 10, wherein the computing unit is located remotely from the plurality of receivers.

14. The system of claim 10, further comprising a monitoring well and wherein at least one of the plurality of receivers are located in the monitoring well.

15. The system of claim 14, wherein the monitoring well monitors progress of hydraulic fracturing.

16. A non-transitory computer-readable medium containing instructions that, when executed by a processor, are configured to:
determine a moment tensor for each of a plurality of microseismic events using an inversion algorithm on raw data detected at a plurality of receivers at a fracking site, each of the moment tensors including two nodal planes;
group a subset of the plurality of microseismic events into a family of microseism is events;
determine whether the family of microseismic events include a single plane that is common across each of the nodal planes of the microseismic events for the moment tensors of the family of microseismic events;
select a solution fault plane for the family of microseismic events, the solution fault plane being the single plane; and
outputting information for optimizing a fracking operation in view of the solution of the fault plane.

17. The computer-readable medium of claim 16, wherein the instructions configured to group a subset of the plurality of microseismic events into a family of microseismic events further comprises instructions configured to:
determine a location for each of the plurality of microseismic events; and
select microseismic events of the plurality of events that occurred proximate each other as members of the family of microseismic events.

18. The computer-readable medium of claim 16, wherein the family of microseismic events are within approximately one hundred meters of each other.

19. The computer-readable medium of claim 16, wherein the plurality of microseismic events are triggered by hydraulic fracturing.

20. The computer-readable medium of claim 16, further comprising instructions configured to generate an image depicting the actual solution fault plane.

* * * * *

UNITED STATES PATENT AND TRADEMARK OFFICE
CERTIFICATE OF CORRECTION

PATENT NO. : 10,302,786 B2
APPLICATION NO. : 14/188170
DATED : May 28, 2019
INVENTOR(S) : Thomas Bardainne Page 1 of 1

It is certified that error appears in the above-identified patent and that said Letters Patent is hereby corrected as shown below:

On the Title Page

Item (71) Applicant, "Thomas Bardainne, Paris (FR)" should read -- CGG SERVICES SA, Massy (FR) --.

Signed and Sealed this
Twenty-seventh Day of August, 2019

Andrei Iancu
*Director of the United States Patent and Trademark Office*